United States Patent
Almutairi et al.

(10) Patent No.: US 8,259,583 B2
(45) Date of Patent: Sep. 4, 2012

(54) ADAPTIVE CQI-BASED HSDPA FLOW CONTROL METHOD

(75) Inventors: Abdulmohsen M. Almutairi, Bellevue, WA (US); Uthman A. Baroudi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 310 days.

(21) Appl. No.: 12/801,335

(22) Filed: Jun. 3, 2010

(65) Prior Publication Data

US 2011/0299393 A1    Dec. 8, 2011

(51) Int. Cl.
*H04L 12/26* (2006.01)
*H04Q 7/00* (2006.01)

(52) U.S. Cl. ........................ 370/235; 370/328
(58) Field of Classification Search .......... 370/229–236, 370/252–255, 328, 331, 338, 401
See application file for complete search history.

(56) References Cited

U.S. PATENT DOCUMENTS

| | | | |
|---|---|---|---|
| 7,227,854 B2 | 6/2007 | Kim et al. | |
| 7,649,831 B2 * | 1/2010 | Van Rensburg et al. | 370/203 |
| 7,653,409 B2 | 1/2010 | Inaba | |
| 2003/0114181 A1 | 6/2003 | Lee et al. | |
| 2005/0243762 A1 * | 11/2005 | Terry et al. | 370/328 |
| 2006/0146749 A1 * | 7/2006 | Lundh et al. | 370/331 |
| 2007/0091801 A1 * | 4/2007 | Shahidi et al. | 370/230 |
| 2007/0171830 A1 | 7/2007 | Vulkan et al. | |
| 2008/0084822 A1 | 4/2008 | Sagfors et al. | |
| 2010/0062768 A1 | 3/2010 | Lindqvist et al. | |
| 2010/0135172 A1 * | 6/2010 | Cui et al. | 370/252 |
| 2012/0120823 A1 * | 5/2012 | Kotecha | 370/252 |

* cited by examiner

*Primary Examiner* — Hong Cho
(74) *Attorney, Agent, or Firm* — Richard C. Litman

(57) ABSTRACT

The adaptive CQI-based HSDPA flow control method selectively eliminates flow control to greatly improve scheduler performance and increase the overall system throughput at low traffic load in a 3G High Speed Downlink Packet Access system. The method utilizes channel quality information (CQI) to predict potential handover conditions and adjusts the degree of flow control applied to classes of users to tune buffer levels accordingly. By regulating buffer levels, the adaptive HSDPA flow control method improves scheduler performance and significantly reduces handover data loss, thereby enhancing the effective Transmission Control Protocol (TCP) throughput.

9 Claims, 10 Drawing Sheets

ADAPTIVE CQI-BASED HSDPA FLOW CONTROL METHOD

BACKGROUND OF THE INVENTION

1. Field of the Invention

The present invention relates to data transmission by cellular telephone or other wireless communication channels, and particularly to an adaptive CQI-based HSDPA flow control method for providing high speed downlink packet access (HSDPA) control.

2. Description of the Related Art

High Speed Downlink Packet Access (HSDPA) is an incremental upgrade to 3G UMTS cellular systems that is optimized for asymmetric data traffic, such as web traffic, which dominates today's Internet. Since being released by 3GPP Release 5 in 2002, HSDPA has gained momentum as a true broadband mobile Internet technology, with downlink speeds ranging from 1.8, 3.6, up to 7.2 Mbps and even higher speeds with recent developments. HSDPA employs advanced mechanisms that provide significant capacity improvements over previous releases of 3G/UMTS systems. The principal element of this improvement is the time-multiplexing of users on a high speed shared channel using a fast scheduler located at the base station.

The most commonly used scheduling algorithm in HSDPA is the Proportional Fair (PF) scheduler, which tries to maximize the system capacity by exploiting the short term variations in channel quality in a relatively fair manner. To operate optimally, this algorithm requires that sufficient amount of traffic is always available in the user's buffer at the base station. However, the buffer levels at the base station are constrained by a flow control protocol that is defined over the Iub link in HSDPA to minimize data loss during handover.

Thus, an adaptive CQI-based HSDPA flow control method solving the aforementioned problems is desired.

SUMMARY OF THE INVENTION

The adaptive CQI-based HSDPA flow control method provides a new algorithm having the capability to predict potential handover conditions and adjust the buffer levels accordingly. The method is based on evaluation of the impact of the Iub flow control protocol on proportional fair (PF) scheduler performance, and on the overall system performance using detailed system-level simulations. Two selected flow control algorithms were compared to the case of disabling Iub flow control in HSDPA. The necessity of such a protocol under reliable higher layer protocols, such as Radio Link Control (RLC) and TCP, especially at low traffic load and less frequent handover conditions, is addressed by implementation of the adaptive CQI-based HSDPA flow control method.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
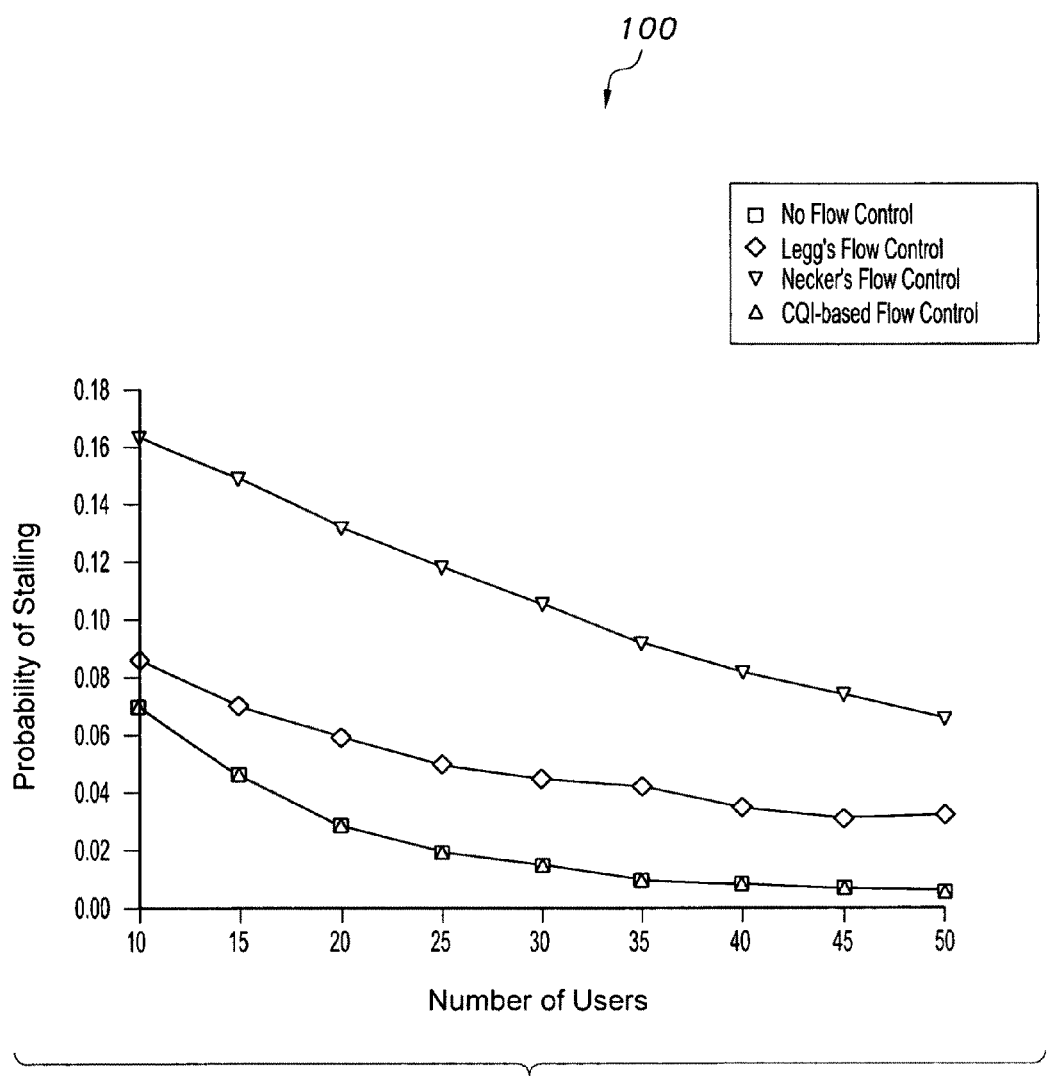
FIG. 1 is a plot showing Probability of Scheduler Stalling.

The adaptive CQI-based HSDPA flow control method selectively eliminates flow control to greatly improve base station scheduler performance and increase overall system throughput at low traffic load. Because high traffic load, data loss at handover increases to a point that negates positive improvement of scheduler performance and reduces the effective system throughput, the adaptive method utilizes channel quality information (CQI) to predict potential handover conditions and tunes buffer levels accordingly. By regulating buffer levels, the adaptive HSDPA flow control method improves scheduler performance and significantly reduces handover data loss, thereby enhancing the effective TCP throughput. U.S. Patent Publication Nos. 2010/0062768, published on Mar. 11, 2010, and 2003/0114181, published on Jun. 19, 2003, which are hereby incorporated by reference in their entirety, show representative HSDPA architecture and interfaces discussed in the present patent application.

The basic building block of HSDPA is a new transport channel, called High Speed Downlink Shared Channel (HS-DSCH), defined in the downlink direction and shared among all users. On the HS-DSCH, the two fundamental WCDMA features are disabled: the fast power control and the variable spreading factor. These are replaced by new features, such as fast layer-1 retransmissions using Hybrid Automatic Repeat Request (HARQ) and fast packet scheduling with short Transmission Time Interval (TTI). Also, HSDPA employs fast link adaptation with various Modulation and Coding Schemes (MCS) that define the channel coding rate, modulation and the number of channelization codes, as well as the transmit power per code. A fixed spreading factor of 16 is used with up to 15 codes in multi-code operation.

The scheduler is located at the base station to reduce retransmission time and to utilize the most recent channel quality measurements. The user reports its channel conditions using Channel Quality Indicator (CQI) to the base station every TTI which is 2 ms. If the user is selected by the scheduler, the CQI is used to determine the appropriate block size based upon the MCS and the capability of the User Equipment (UE). The HARQ process then transmits the block and waits for an acknowledgment from the UE. If the UE receives the block in error, it sends a negative acknowledgment to the HARQ entity in the base station, which retransmits the block again. Two retransmission schemes are defined. The first is chase (soft) combining in which the receivers keep the erroneous block and combine it with the retransmitted block to enhance decoding capability. The second one is incremental redundancy, whereby the transmitter sends additional redundancy bits in each retransmission attempt, instead of retransmitting the whole block again.

One of the key elements of High Speed Downlink Packet Access (HSDPA) is the fast scheduler being located in the base station. A sufficient amount of traffic needs to be buffered at the base station to allow the scheduler to operate efficiently. However, the users' buffers at the base station are managed by a flow control protocol in order to minimize data loss during handover. Although eliminating flow control greatly improves the scheduler performance and increases the overall system throughput at low traffic load, data loss at handover increases at high traffic load to a point that negates the positive improvement of the scheduler performance and reduces the effective system throughput. In light of these results, the adaptive CQI-based HSDPA flow control method (see the flowchart 910 in FIG. 10) utilizes information about channel quality to predict potential handover conditions and tune buffer levels accordingly. The algorithm improves the scheduler performance and reduces the handover data loss by at least 44% compared to the above case, which only results in an enhancement of the effective TCP throughput.

Typically, the base station uses an opportunistic scheduling strategy that exploits the short term variations in channel quality to maximize system performance. A popular scheduling algorithm used in HSDPA is the Proportional Fair (PF) scheduler, which offers a trade-off between user fairness and cell capacity. The algorithm selects the user that maximizes the Relative Channel Quality Indicator (RCQI) defined as:

$$RCQI_i(t) = \frac{R_i(t)}{T_i(t)} \tag{1}$$

where R is the "achievable" instantaneous rate, taking available data in the buffer into account. The average throughput, T, is updated in every time slot for all active users as follows:

$$T_i(t) = \left(1 - \left[B_i(t) \stackrel{?}{>} 0\right]\frac{1}{T_c}\right)T_i(t-1) + \frac{1}{T_c}R'_i(t) \tag{2}$$

where $R'_i$ is the actual served rate when the user is scheduled and 0 otherwise, $B_i$ in the boolean expression is the current buffer size, and $T_c$ is the exponential filter for the averaging process.

In HSDPA, packets that arrive at the Radio Network Controller (RNC) are segmented into smaller Protocol Data Units (PDUs) and stored temporarily in the Radio Link Control (RLC) buffers. Depending on the RLC mode of operation, these PDUs are encapsulated in a HS-DSCH Data Frame and sent to the base station (Node B) over the Iub link. When Node B receives the HS-DSCH Data Frame, it extracts all PDUs and stores them in the appropriate priority queues until they are scheduled and transmitted successfully over the air. The transmission of PDUs over the Iub link between the RNC and Node B is managed by a flow control protocol as defined in the 3GPP specification. The protocol employs a credit-granting mechanism using separate control messages, as well as embedded fields in the HS-DSCH Data Frame.

Whenever the RNC has some data to be sent to Node B, it sends a Capacity Request message containing the number of PDUs in all buffers. Node B responds by sending a Capacity Allocation message containing credits, which are the number of PDUs that can be sent for each buffer. Also, the Allocation message indicates the interval during which the RNC can consume these credits, and also indicates the repetition period, which is how many times the interval can be repeated without the need for a new request. In addition to these separate messages, each HS-DSCH Data Frame contains a field called the User Buffer Size (UBS), indicating how many PDUs are pending behind in the RNC for a specific user buffer. Capacity Request and Capacity Allocation messages can be sent on demand, or at any other events, depending upon the algorithm employed.

The flow control aims at maintaining Node B's buffer level at appropriate levels. Although not stated explicitly in 3GPP specifications, the primary goal of this flow control protocol is to keep low the number of PDUs held in Node B's buffer in order to minimize data loss during hard handover. However, Node B buffers should be maintained at adequate levels in order to avoid wasting radio resources, which may occur when the scheduler selects a buffer with insufficient data to fully utilize the allocated time slots. The second, less important goal, is to reduce the memory requirement of the Node B hardware. Another goal is to control the transmission load over the Tub to avoid congestion in the underlying transport layer. Typically, the flow control algorithm is run by Node B, since it controls the amount of data available for the scheduling algorithm and thus needs to be carefully designed to minimize the impact on the scheduler performance.

The Iub flow control, as described above, serves as an input function into the scheduling algorithm, which resides in Node B. Scheduling in HSDPA and other wireless networks has been investigated thoroughly over the past few years. However, the issue of flow control in HSDPA did not catch that much attention, although it has a direct impact on the scheduling performance. For example, a related art optimized flow control algorithm for HSDPA has been presented and evaluated under both HTTP and basic TCP traffic loads. The algorithm tries to maintain the following equality for each buffer in Node B:

$$M_{tot} = M_{used} + M_{free} + M_{alloc}$$

where $M_{tot}$ is the current maximum number of PDUs that may be buffered at Node B. It is bounded by $M_{max}$, which is defined as follows:

$$M_{max} = K \cdot \frac{\text{max bits}}{PDU\ size} \tag{4}$$

where max bits is the maximum number of payload bits that can be scheduled in one time slot and K is an integer. $M_{used}$ is the number of PDUs currently buffered at Node B. $M_{alloc}$ is the number of PDUs allocated by the flow control process to the RNC that have yet to be used. $M_{free}$ is the number of PDUs that could additionally be allocated to the RNC (within $M_{tot}$). This algorithm, however, was only studied in a single cell environment where handover is not modeled. Also, RLC Acknowledged Mode (AM) was not modeled.

A related art generic flow control algorithm has been studied with respect to scheduling performance under TCP traffic loads with specific signaling constraints. The related art algorithm works by tuning the buffer level for every data flow so that a predefined queuing time, $T_w$, in Node B is maintained. Therefore, the buffer level, B, of every data flow would be given by:

$$B_w = R_o \cdot T_w \tag{5}$$

where $R_o$ is the output bit rate of the PDUs transmitted over the air interface. This is the actual data rate assigned by the packet scheduler, and therefore it must be measured periodically and averaged over a certain measurement interval. The algorithm tries to compensate for the difference between the desired buffer level $B_w$ and the actual level B within an update period $T_u$ by increasing or decreasing the input rate $R_i$. Once a new value of $R_o$ is obtained, the algorithm calculates the new value of $R_i$ as follows:

$$R_i = \max\left\{0, R_o + \alpha \frac{B_w - B}{T_u}\right\} \text{ for } 0 \leq \alpha \leq 1 \quad (6a)$$

Thus, for every data flow during the next update period $T_u$, the RNC may transfer a maximum data volume $D_i$:

$$D_i = R_i \cdot T_u \quad (6b)$$

This is done by issuing resource credits grants to the RNC at regular intervals. The update interval has to be small enough to allow the flow control to accurately follow the channel dynamics toward each user. Also, it has to be large enough to keep the signaling traffic between the RNC and Node B at a reasonable level. This algorithm was only studied in a single cell environment where handover is not modeled. Also, an infinite window size for RLC AM was assumed.

A more detailed theoretical framework based on classical control theory has been suggested for HSDPA flow control algorithms. However, prior art work has not considered RLC dynamics or any kind of TCP traffic loads, and instead assumed that an infinite traffic source is always available at the RNC. This might be suitable to study the flow control and buffer dynamics given a specific outflow rate from Node B buffers, but it lacks the overall view of the system when all components are put together under reliable protocols, such as RLC and TCP.

The primary goal of HSDPA Tub flow control protocol is to minimize the packet loss during handover. However, to the inventors' knowledge; there heretofore has been no quantitative assessment of the impact of such packet loss when operating under reliable link protocols, such as RLC Acknowledged Mode (AM).

The adaptive CQI-based HSDPA flow control method utilizes an investigation of the effect of disabling the Iub flow control protocol and evaluating the system performance with RLC AM using a detailed protocol simulation. The Iub, as defined in the Third Generation Partnership Project (3GPP), is the interface between the base station and the radio network controller. Results of using the adaptive CQI-based HSDPA flow control method described herein are compared against Legg's algorithm and Necker's algorithm.

The basic model used is based on the models implemented in the Enhanced UMTS RAN Extensions (EURANE), which provide UMTS and HSDPA support to the Network Simulator (NS). Extensions were implemented to simulate mobility, handover, and flow control signaling. The Proportional Fair (PF) scheduling algorithm was used in evaluation of the method shown in the flowchart 910. One assumption is that only one user is scheduled per time slot, and therefore code-multiplexing is not modeled. A continuous TCP source is assumed for all users in order to operate the system under high traffic load. The choice of a continuous TCP source is made in order to isolate the flow control dynamics from any traffic discontinuities that typically exist in more realistic traffic sources, such as HTTP. To get different load scenarios, the number of active users is varied in the system from ten to fifty users, at which the system can be observed to reach its limit. Also, it should be noted that the mobility model used here provides a highly active mobile environment with a relatively large number of handovers. The reason for using such model is to assess the effect of flow control on handover performance, which is the primary target of the flow control in HSDPA.

The impact on the Proportional Fair scheduling algorithm, which takes into account the amount of data available in the Node B buffers, is evaluated. In HSDPA, it is often possible that the scheduled user does not have enough data to transmit at the maximum possible rate. This situation is denoted as scheduler stalling. A plot 100 of the average probability of stalling for the three cases is shown in FIG. 1. It should be understood that FIG. 1 and subsequent drawings also show the results of using the adaptive CQI-based HSDPA flow control method, described in detail in FIG. 10. The least stalling probability is observed when flow control is disabled. In the absence of any flow control, PDUs are immediately transferred from the RNC to Node B, thus keeping the scheduler queues occupied most of the time. On the other hand, prior art flow control algorithms tend to hold the PDUs in RNC buffers until they are needed at Node B. However, due to the signaling protocol delay, these algorithms often fail to cope with the rapid variations in channel data rate. This leads to situations where some buffers run below the target level for many time slots before they can be refilled in the next flow control cycle.

Figure 2:
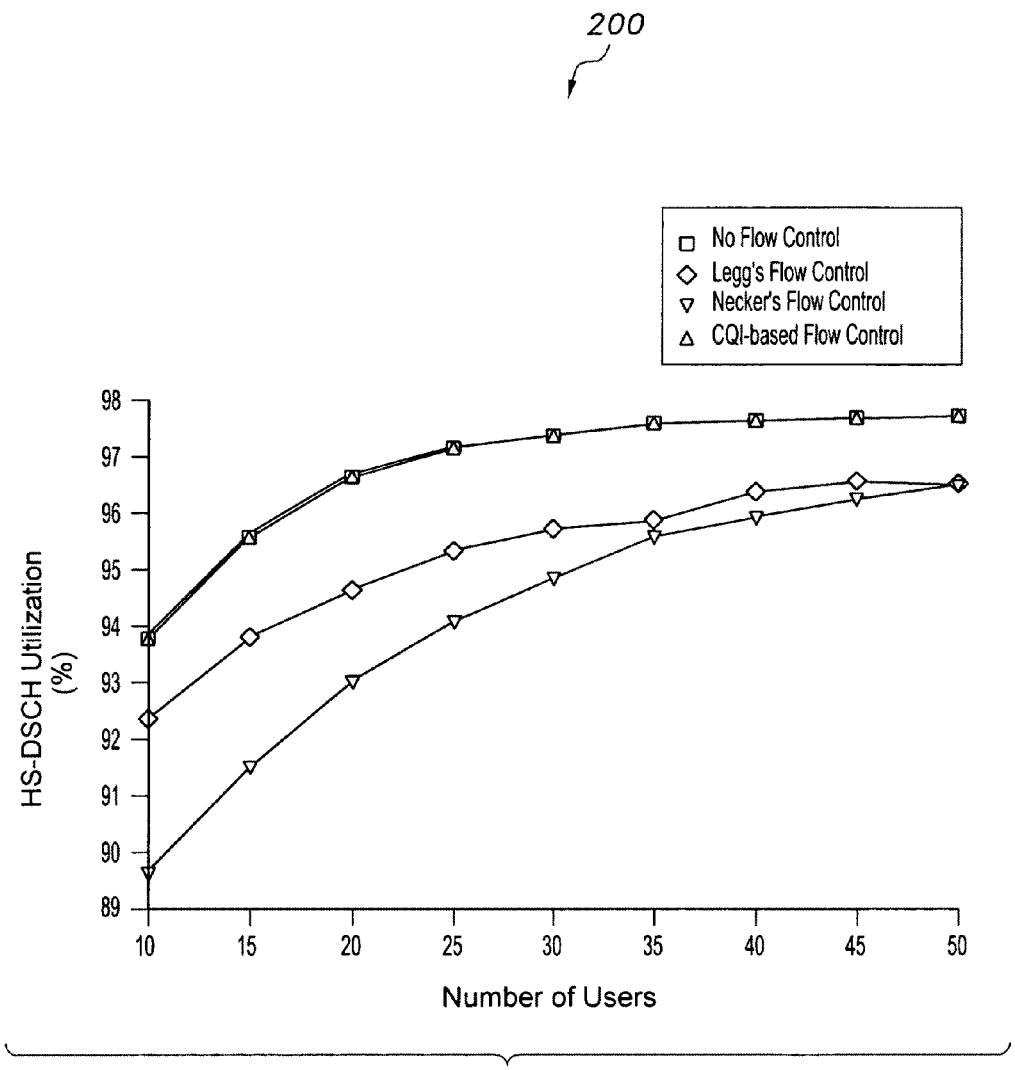
FIG. 2 is a plot showing Average HS-DSCH Utilization.

Plot 200, as shown in FIG. 2, shows that stalling in the scheduler causes under-utilization of the HS-DSCH bandwidth. The result shown agrees with that of the stalling probability. Another important factor is that an empty buffer in the Node B causes the PF scheduler to skip the user, even if he has the largest RCQI value in that slot. The consequence of this less than optimal decision is that the next available user with a non-empty buffer may not support as high rate as the "best" user, which reduces the throughput of the system.

In this simulation model, the scheduler selects only one user per slot, which means all HSDPA codes are allocated to one user. However, the problem can be generalized to HSDPA with code multiplexing (i.e., multiple users scheduled per slots) for the following reasons. First, the maximum number of codes allocated to HSDPA is 15, and hence the maximum number of simultaneous transmission is limited to 15. So if multiple users are scheduled in one slot, stalling can still occur if the sum of the data rates allocated for all these users is less than the total channel capacity in that time slot. Second, scheduling multiple users per slot requires a joint optimization function in terms of the MCS scheme, the number of multicodes and the transmit power for each user. This function tries to maximize the sum of the bit rates assigned to all users, given a maximum allowable HSDPA power, a maximum number of multicodes that can be allocated collectively to all users, and certain per-user constraints, such as the number of multicodes and the MCS schemes supported.

There are two optimization models for this problem. The first is channel-based, which assumes that the buffer for each user is never empty, i.e., the actual throughput is identical to the assigned bit rate. The second optimization model is a more efficient load-based model, which takes into account the buffer level for each user. So, the buffer occupancy is already factored in the multi-user scheduling decision, and hence will be subject to the same issue as in the single-user scheduling decision.

Second, the impact on the RLC layer and its Acknowledged Mode is analyzed. Holding packets in RNC buffers by the flow control protocol is likely to increase the time spent by the packet in UTRAN, and hence increases the overall delay. To look at this point closely, the total UTRAN delay as seen by a new RLC PDU, i.e., not retransmitted during its lifetime inside UTRAN, is analyzed. Flow control histogram plots 300 of FIG. 3 show the break down of this delay into queuing time at the RNC, Iub latency, queuing time at the Node B, and Mac-hs delay, which covers the HARQ retransmission delay, air interface delay and HARQ re-ordering delay at the UE.

Figure 3:
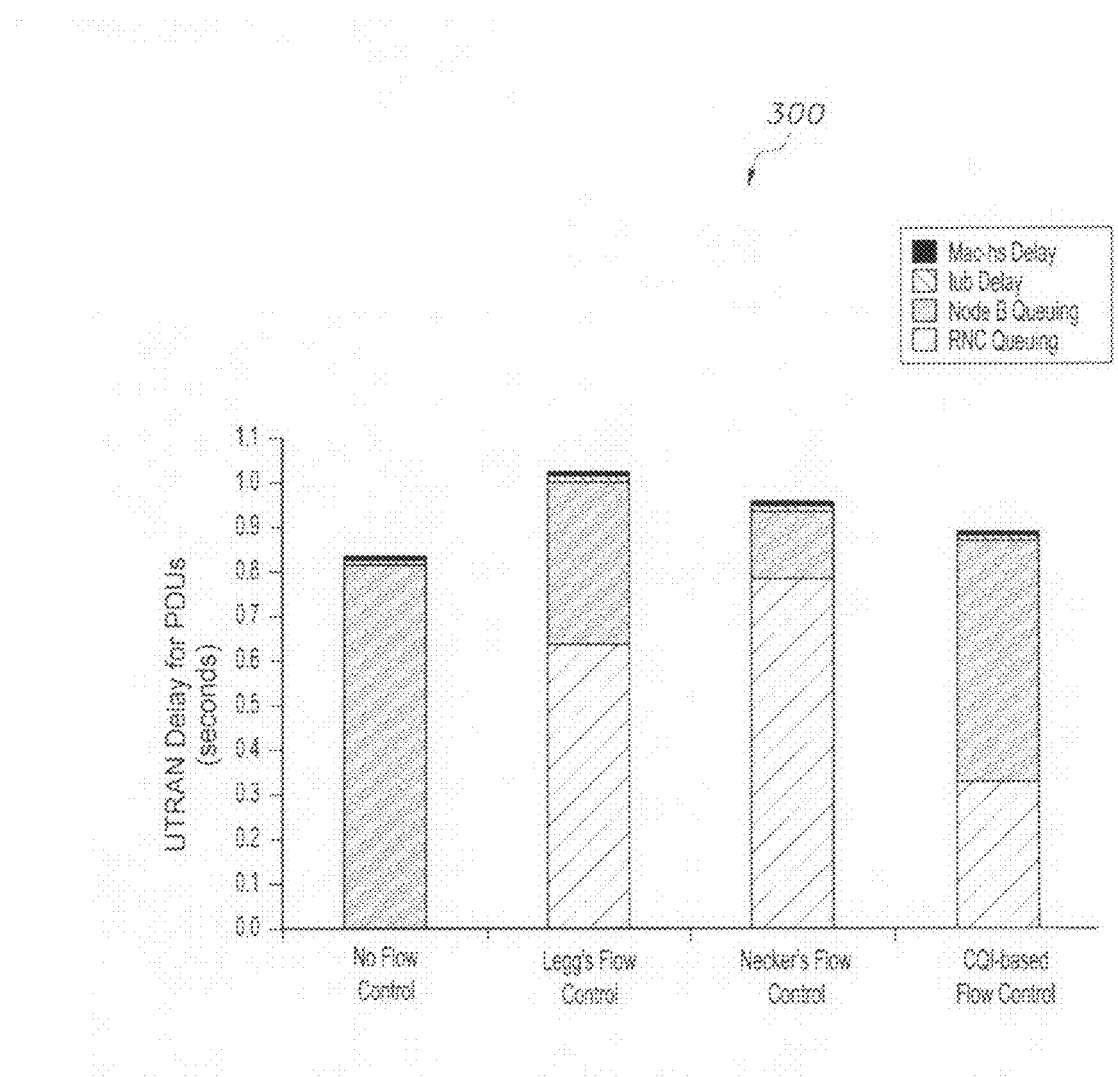
FIG. 3 is a plot showing UTRAN Delay Decomposition for RLC PDUs.

FIG. 3 illustrates the delay components at a load of fifty users, but a similar profile was observed at lower loads. For the two flow control algorithms, a significant percentage of the delay comes from the buffering in the RNC waiting for credit allocation. On the other hand, when flow control is disabled, most of the delay comes from queuing at the Node B.

However, disabling flow control at high traffic loads can lead to excessive queuing at the Node B, which increases the round trip delay of UTRAN, thus causing problems at the RLC layer, such as timeouts and slow operation of the window-based ARQ protocol used in the Acknowledged Mode (AM). These timeouts, coupled with the high data loss during handover, result in a higher PDU retransmission rate at the RLC layer, as compared to the plot 400 of the two flow control algorithms in FIG. 4. A higher retransmission rate at the RLC layer affects TCP performance, as will be explained in the following section. Finally TCP level performance, an important result of the adaptive CQI-based HSDPA flow control method, is shown.

The combination of enhanced scheduler performance and handover data loss has a conflicting effect on the ultimate user goodput, which is the effective throughput at the TCP layer. In computer networks, goodput is the application level throughput, i.e., the number of useful bits per unit of time forwarded by the network from a certain source address to a certain destination, excluding protocol overhead and excluding retransmitted data packets.

Figure 5:
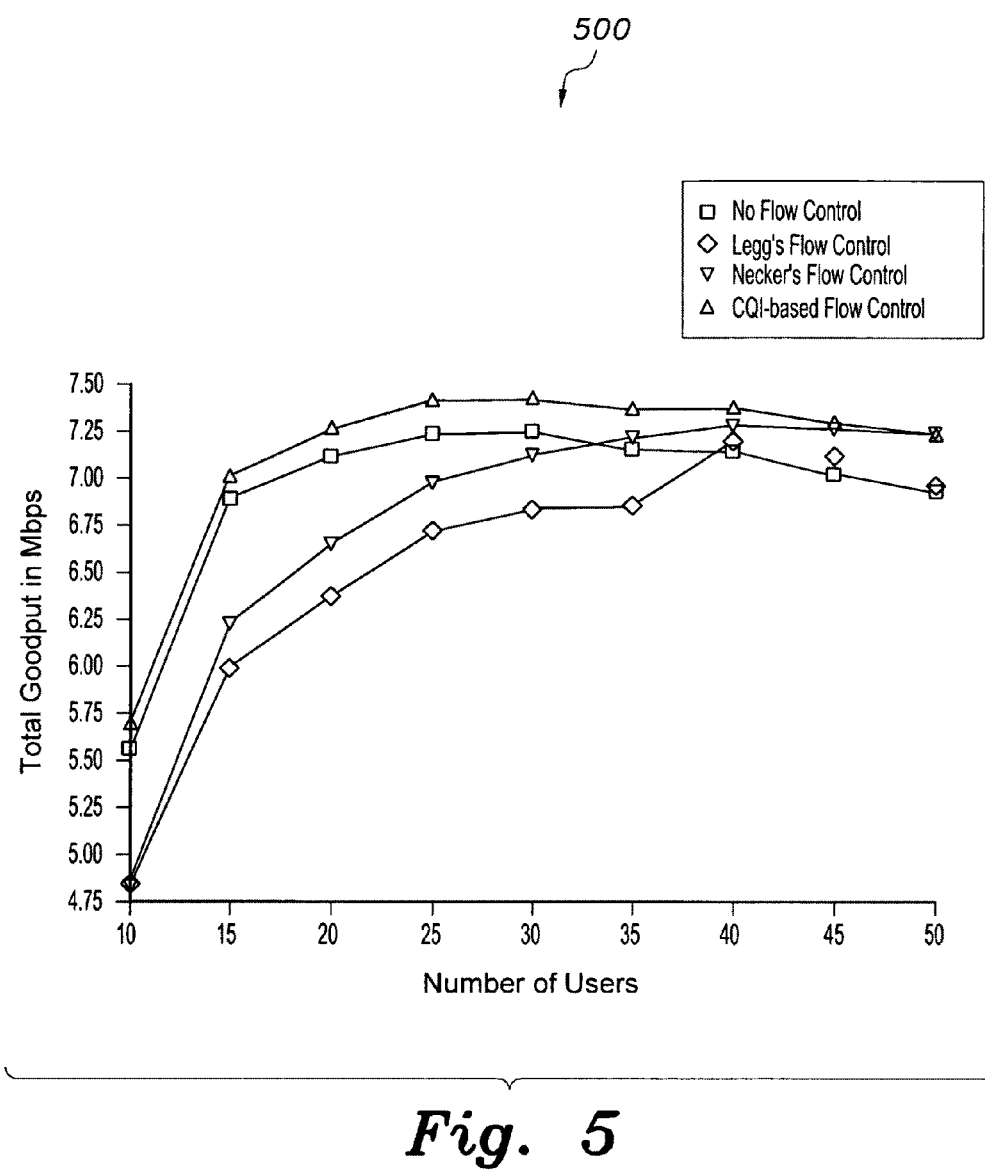
FIG. 5 is a plot showing Total System Goodput.

The total TCP goodput by all users in the system is depicted in plot 500 of FIG. 5. At low traffic load, the overall system goodput when flow control is disabled is better by at least 10% compared to the closest case, which is Necker's algorithm. However, as the traffic load increases, the difference decreases until it actually falls below the goodput of the two algorithms.

Figure 6:
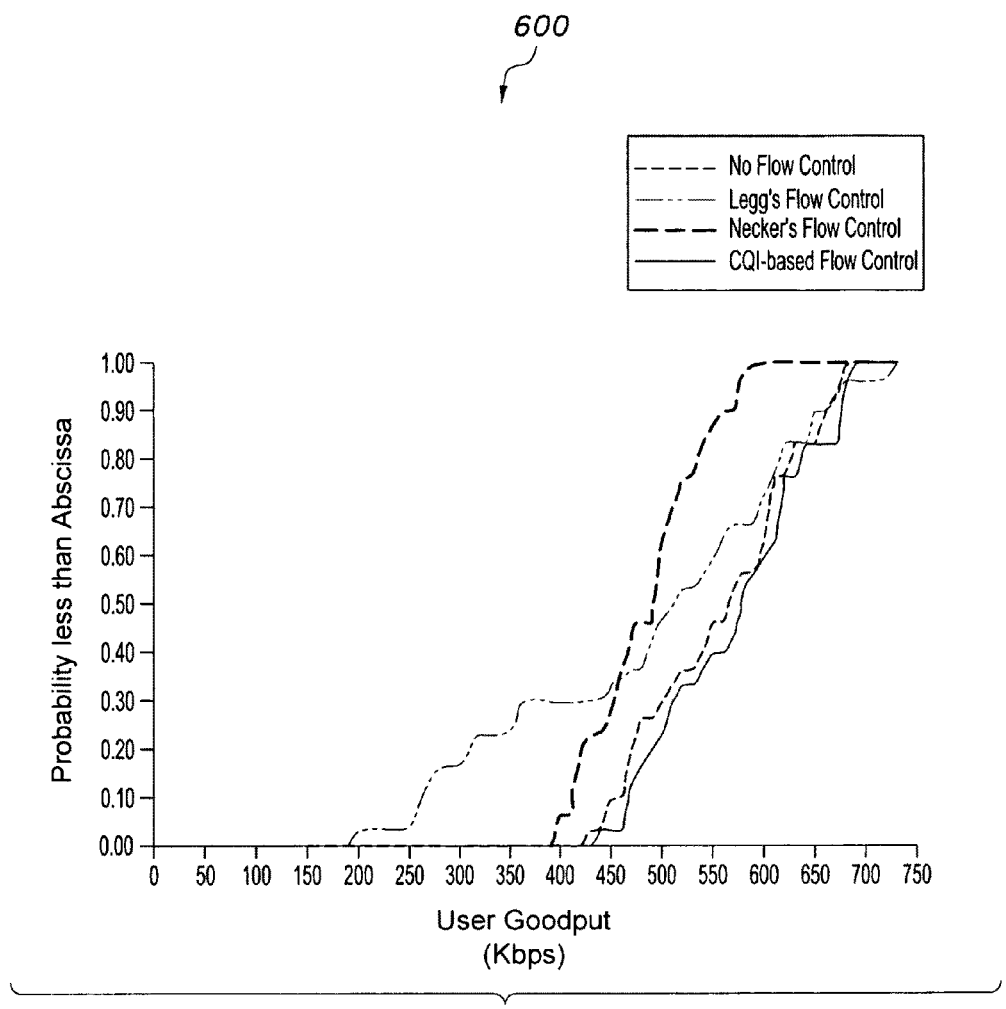
FIG. 6 is a plot showing CDF of User Goodput at N=10 users.

At low traffic load, e.g., N=10 users, disabling flow control enhances the user goodput by at least 50 Kbps more than the two flow control algorithms, as can be seen in plot 600 of FIG. 6. The reason for this improvement (despite the high handover data loss) is the enhanced scheduler performance, which increases the throughput of the air interface and outweighs the effect of retransmissions. Legg's algorithm shows slightly better user goodput compared to Necker's, which can be related to the same reason. However in Legg's algorithm, the enhancement in the scheduler performance is not large enough to counteract retransmission at this traffic load.

Figure 7:
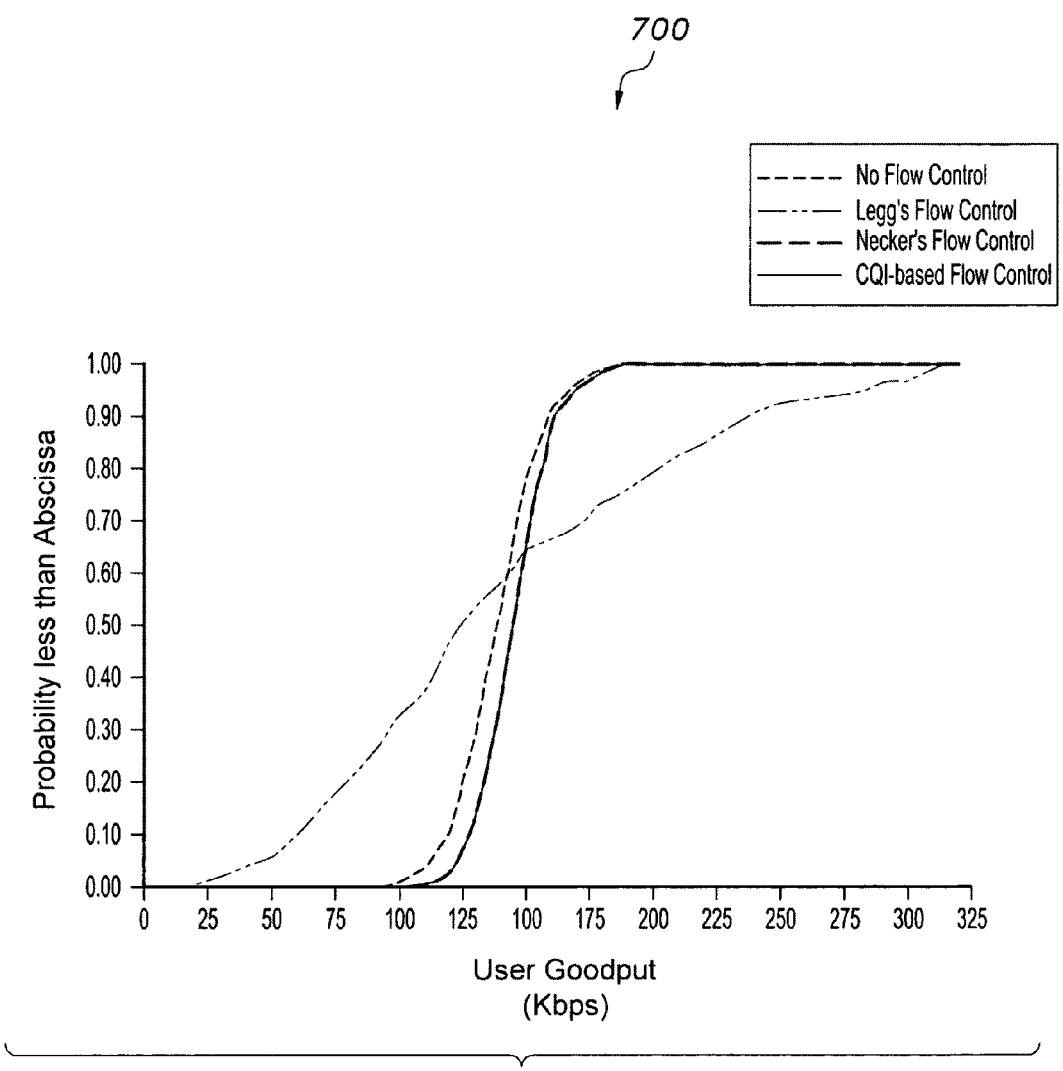
FIG. 7 is a plot showing CDF of User Goodput at N=50 users

The situation is reversed at high traffic load, e.g., N=50 users, where both Necker's and Legg's algorithms show better goodput as compared to the no flow control case. This is evident from FIG. 5, as well as from the cumulative distribution function (CDF) plot 700 in FIG. 7. The reason behind this is that the handover packet loss when flow control is disabled is more significant than enhancement of the scheduler performance at such traffic load.

Two points can be observed from this figure. The first is that the difference between the CDF graph in Necker's algorithm and the no-flow control case is not large, but in the order of 10 Kbps. For example, the 75% quartile of goodput in the no flow control case is about 146 Kbps, compared to 159 1 Kbps and 152 1 Kbps in Legg's and Necker's algorithms, respectively. This means that disabling flow control does not impose severe degradation of TCP performance, even at high traffic load.

Figure 8:
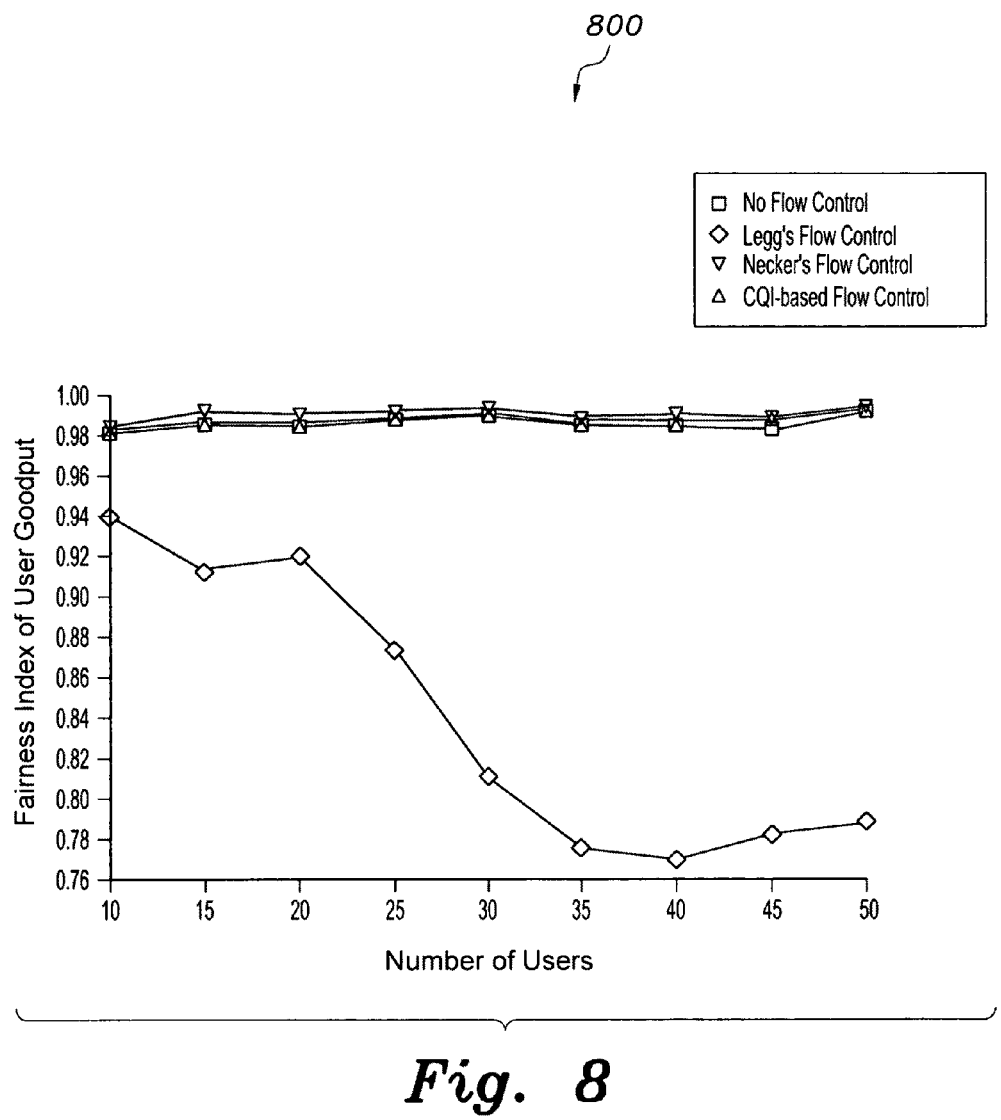
FIG. 8 is a plot showing Fairness Index of User Goodput.

The second observation is that although Legg's algorithm outperforms Necker's algorithm in terms of scheduler performance, it shows less overall system goodput at the TCP layer, which can be attributed to the distribution of the users' goodputs over a wide range, from 25 kbps up to 300 kbps. This indicates a fairness issue in Legg's algorithm, as illustrated by the Fairness Index plot 800 in FIG. 8. The result shows that Legg's algorithm interacts negatively with the PF scheduling algorithm and reduces its fairness as the traffic load increases.

From the comparative evaluation presented above, it can be seen that the real benefit of the Iub flow control protocol is when the system operates at high traffic load in a highly mobile environment with frequent handovers. In practical situations, the system may not operate at these conditions very often. Indeed, it is quite common for users to be stationary in broadband-like HSDPA services. This suggests that a loose flow control algorithm that can help improve the scheduler performance for the majority of users is better than a strict flow control algorithm that minimizes packet loss at handovers for the few users that undergo frequent handovers.

Figure 10:
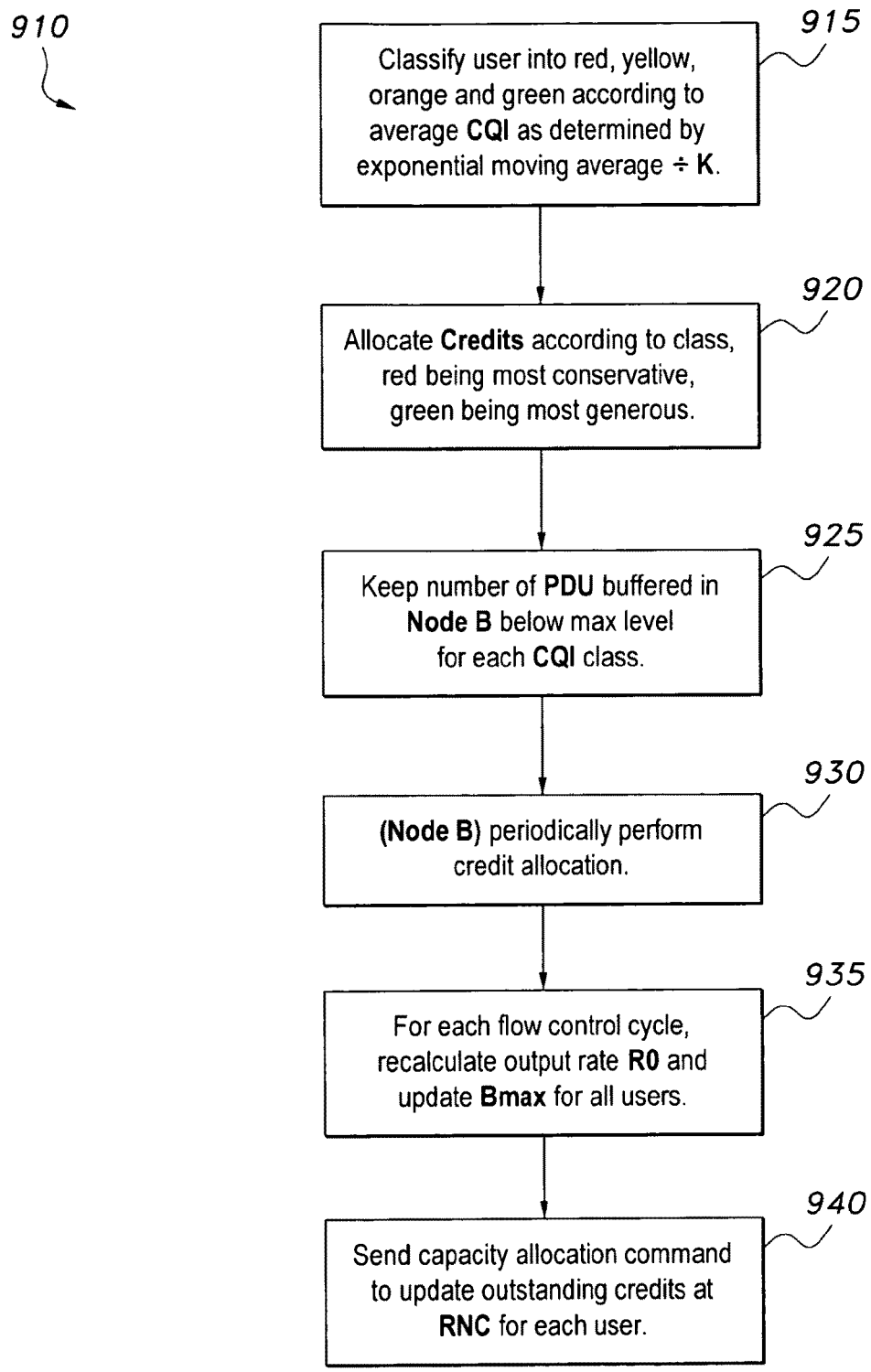
FIG. 10 is a flowchart of the adaptive CQI-based HSDPA flow control method according to the present invention.

Referring to FIG. 10, a new computer-implemented, adaptive CQI-based HSDPA flow control method 910 is shown to utilize information about channel quality to predict potential handover conditions and tune the buffer level accordingly. The adaptive CQI-based HSDPA flow control method, shown in flowchart 910, differentiates between those users who are close to the base station, thus enjoying good channel conditions, and those who are far away and likely to experience a handover condition. One way to classify users as such is by utilizing the actual CQI measurements that are used for HARQ and scheduling.

Figure 9:
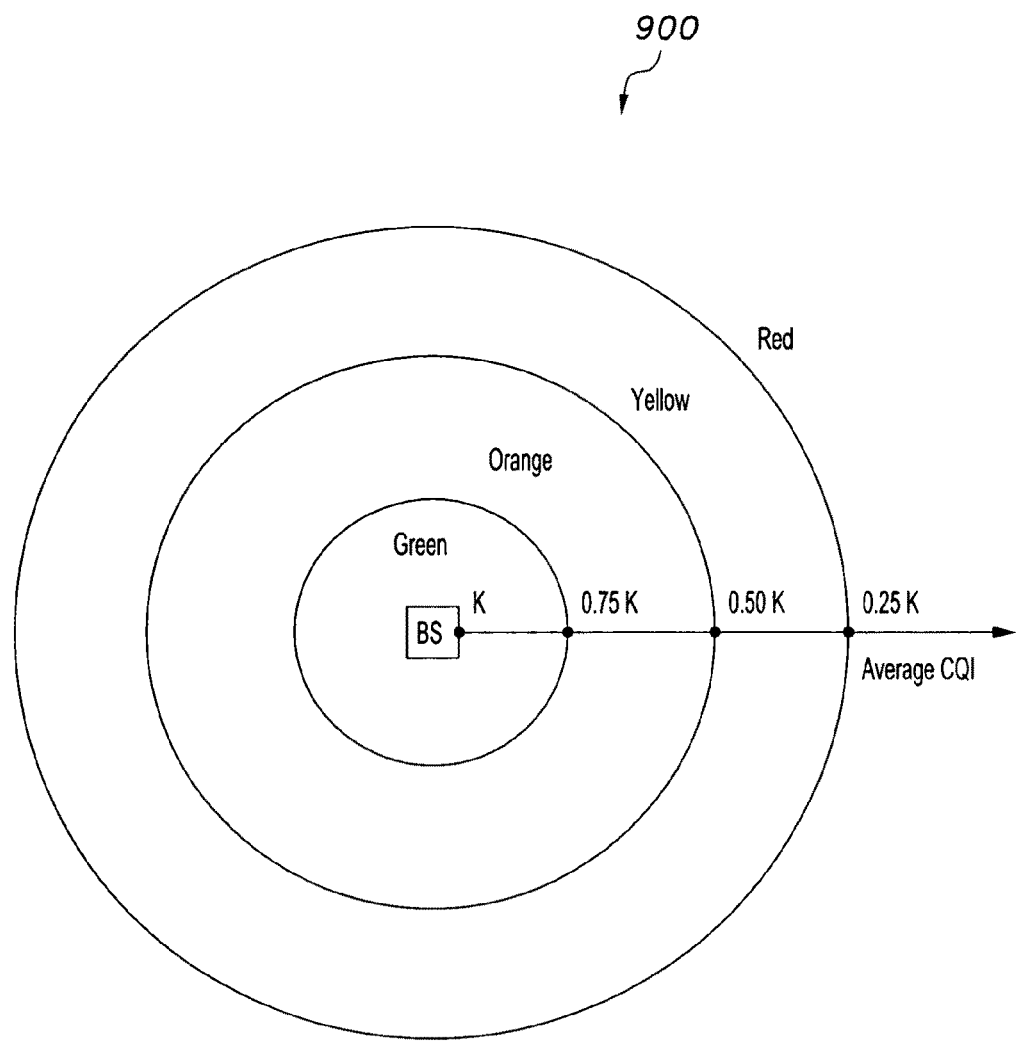
FIG. 9 is a diagram showing CQI-based Classification of Users.

As shown in FIGS. 9-10, the method uses an intuitive strategy wherein at step 915, users are classified into four classes according to their average CQI. If a user is suffering from bad channel conditions, i.e., in the red class, the algorithm allocates credits in a conservative manner. On the other hand, if the user is enjoying very good channel conditions, i.e., in the green class, the process allocates credit more generously. The credit allocation process is performed at step 920.

The flow control portion of the method keeps track of the CQI status of each user in the cell. The method uses an exponentially moving average to compute the average CQI as follows:

$$\overline{CQI_i}(t) = \alpha \cdot CQI_i(t) + (1-\alpha) \cdot \overline{CQI_i}(t-1) \qquad (7)$$

where $\alpha$ is the smoothing factor of the averaging process. The average CQI is updated every time slot, or TTI, which is 2 ms in HSDPA. The user class is then determined based on a class indicating ratio, $$\frac{\overline{CQI_i}}{K},$$

where K is a constant that represents the highest predictable CQI value in the system. The value of K should be less than the maximum CQI supported by the specific UE category. The class indicator L is used to identify the green, orange, yellow and red areas in FIG. 9 as follows:

$$L = \begin{cases} 0.25 & \text{if } 0 < \frac{\overline{CQI}}{K} \leq 0.25 \\ 0.5 & \text{if } 0.25 < \frac{\overline{CQI}}{K} \leq 0.5 \\ 0.75 & \text{if } 0.5 < \frac{\overline{CQI}}{K} \leq 0.75 \\ 1 & \text{if } 0.75 < \frac{\overline{CQI}}{K} \leq 1 \end{cases} \qquad (8)$$

In general, the method includes a step 925 that tries to keep the number of PDUs buffered in Node B below the maximum level for each CQI class. The maximum buffer level, $B_{max}$, for each CQI class is equivalent to the number of PDUs that can be transmitted over the air if the user is to be continuously scheduled for the next $Iub_{RTT}$ seconds. This time interval $Iub_{RTT}$ is the round trip time required for the flow control protocol to signal the RNC to refill the buffer again. The derivation of the target buffer level, $B_{max}$ follows.

First, the maximum output rate $R_o$ in one time slot (TTI=2 ms) for a certain CQI class is calculated as follows:

$$R_o = \frac{TBS(L \cdot K)}{TTI} \quad (9)$$

where the term TBS(L·K) is a lookup function for the Transport Block Size of a specific tabulated CQI. The CQI class L·K is used here instead of the actual CQI value. Using this output rate, the maximum buffer level $B_{max}$, which is the number of PDUs that can be transmitted in one Iub round trip time, is given by:

$$B_{max} = \frac{R_o \cdot Iub_{RTT}}{PDU \text{ Size}} \quad (10)$$

According to step 930, the credit allocation is done periodically by the Node B, as in the case of Necker's algorithm. According to step 935, in every flow control cycle, the algorithm recalculates the output rate $R_o$ and updates $B_{max}$ for all users. The number of credits, C, is given by C=max{0, $B_{max}$-B}, where B is the actual buffer level at the time of allocation. At step 940, the flow control process then sends a capacity allocation command to update the outstanding credits at the RNC for each user. The zero here is used to overwrite the outstanding credits that are not yet used by the RNC in order to force the RNC to stop sending PDUs when the actual buffer level exceeds the target level.

Finally, it should be noted that there are several relaxations in this algorithm. The main one is that the output rate, $R_o$, is based on the assumption that the scheduler will continue selecting the same user for as many time slots as there are in one Iub round trip time. If this assumption does not hold, the buffer level, $B_{max}$, will be always higher than the desired one. The second relaxation is that even if the above assumption holds and the user remains in one class for a long time, the output rate $R_o$ of each CQI class is, by definition, larger than the actual channel data rate as seen by the user. This could result in allocating more credits than what can be transmitted in one cycle. These relaxations provide a loose flow control strategy that allows more PDUs than what is actually needed.

The performance of the adaptive CQI-based HSDPA flow control algorithm has been evaluated and compared with the two flow control algorithms, as described above. Following the same analysis presented above, the impact of the new algorithm on the PF scheduler is observed. The average probability of stalling is compared to the three previous cases in FIG. 1. Clearly, the present algorithm achieves almost the same performance as the no flow control case, which indicates that sufficient PDUs are always available to be consumed by the scheduler. This is expected because the allocation strategy is so generous to an extent that closely matches the case when flow control is disabled. However, the algorithm can still reduce the handover packet loss, as will be shown later. Also, the algorithm outperforms the other two algorithms, and closely matches the no flow control case in terms of HS-DSCH utilization, as shown in FIG. 2.

Figure 4:
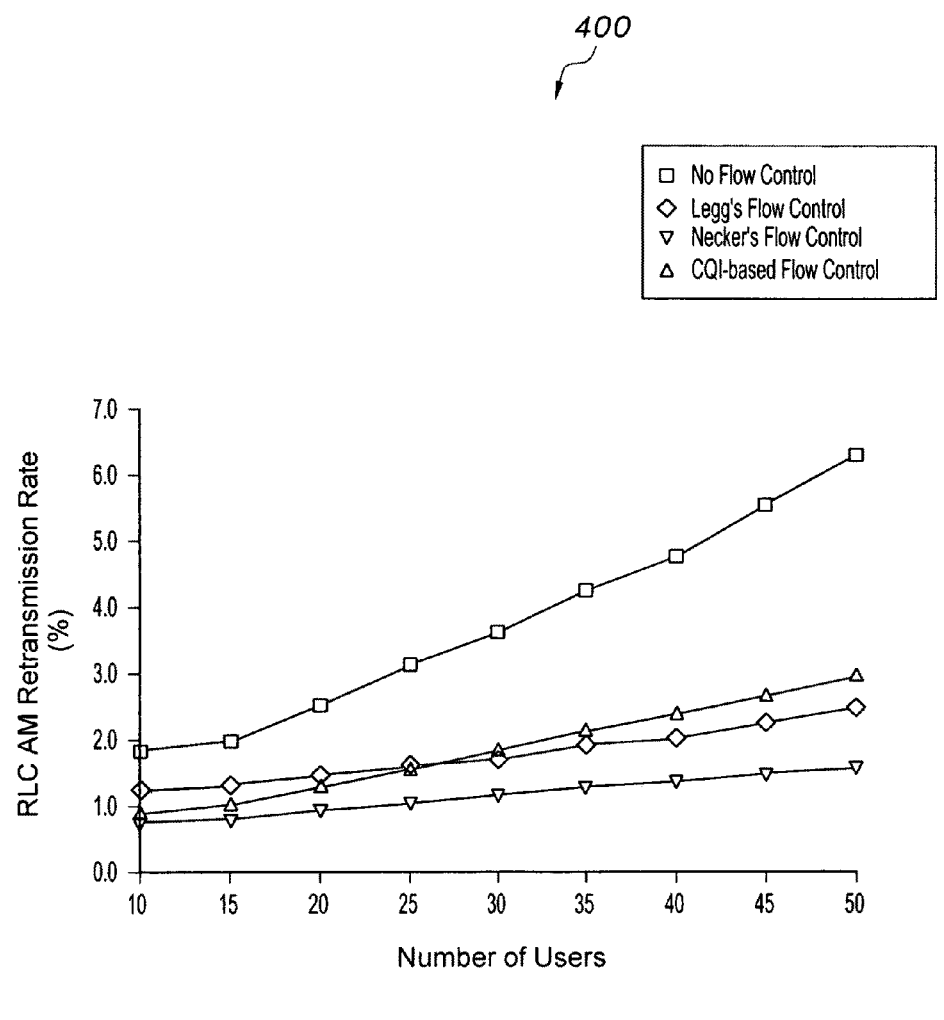
FIG. 4 is a plot showing RLC AM Retransmission Rate.

In the adaptive CQI-based HSDPA flow control method, the RNC queuing time constitutes only 37% of the total delay, compared to 81% and 62% in Necker's algorithm and Legg's algorithm, respectively, as shown in FIG. 3. As explained earlier, queuing at the RNC increases the chances of empty buffers in the Node B, which reduces the scheduling performance. On the other hand, excessive queuing at the Node B increases the round trip delay of UTRAN, thus causing more timeouts and slower operation of RLC protocols. However, the adaptive CQI-based HSDPA flow control method managed to strike a balancing point where the relatively high buffer level at the Node B enhances the scheduler performance, but still keep the Node B queuing time and handover packet loss at an acceptable level. This is clearly evident from the average PDU retransmissions rate at the RLC layer, as depicted in FIG. 4. The results in this figure indicate that the enhancement in the scheduler performance outweighs the degradation at the RLC layer. This is not the case when flow control is disabled, since the amount of packet loss at handover is much more significant in that case, as described earlier.

The net effect of the above results on the TCP layer is presented here. The CDF of the user TCP goodput is plotted for both low and high traffic load scenarios in FIG. 6 and FIG. 7, respectively. At low traffic load, the adaptive CQI-based HSDPA flow control method achieves at least 10 Kbps more than the no flow control case, which is, by itself, better by 50 Kbps than the other two algorithms. At high traffic load, the present method closely matches the performance of Necker's algorithm, which is already better than the no flow control at this load.

These interesting results can be attributed to the "balanced" combination of two factors. The first is the enhanced scheduler performance due to the relaxed flow control, which boosts the throughput over the air in both low and high traffic loads. The second is the relatively lower packet loss during handovers and fewer retransmissions at the RLC layer. Earlier, it was indicated that Necker's algorithm achieves better goodput than the no flow control case mainly because the packet loss during handovers was significant in the no flow control case at high traffic load. In the present method, packet loss is reduced to 44% less than the no flow control case, which improves the overall TCP performance. Finally, the fairness index indicates a fair distribution of the user goodput using the present method, as shown in FIG. 5.

It will be understood that the description and diagrams herein depicting the adaptive CQI-based HSDPA flow control method are exemplary only, and may be embodied in a dedicated electronic device having a microprocessor, microcontroller, digital signal processor, application specific integrated circuit, field programmable gate array, any combination of the aforementioned devices, or other device that combines the functionality of the adaptive CQI-based HSDPA flow control method onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the apparatus and steps of the method described herein.

It is to be understood that the present invention is not limited to the embodiment described above, but encompasses any and all embodiments within the scope of the following claims.

We claim:

1. A computer-implemented adaptive CQI-based HSDPA flow control method, comprising the steps of:
   computing an average Channel Quality Information (CQI) for each user in an HSDPA (High Speed Downlink Packet Access) cell;
   dividing the users into a plurality of classes based on the average CQI computation for each of the users, the classes including:
      a first class representing a most conservative credit allocation policy having a maximum of Iub flow control;
      a last class representing a most generous credit allocation policy having virtually no Iub flow control; and
      at least one intermediate class representing an intermediate credit allocation policy having intermediate Iub flow control;
   allocating Iub flow control for each of the users according to the user's class associated credit allocation policy; and
   sending a capacity allocation command based on the Iub flow control allocating step to update the outstanding credits at a Radio Network Controller (RNC) for each of the users.

2. The computer-implemented adaptive CQI-based HSDPA flow control method according to claim 1, wherein said dividing step results in four said user classes, including the first class, the last class, the at least one intermediate class consisting of two intermediate classes.

3. The computer-implemented adaptive CQI-based HSDPA flow control method according to Claim 1, wherein said credit allocation is done periodically by a Node B.

4. The computer-implemented adaptive CQI-based HSDPA flow control method according to claim 1, wherein said average CQI computation is formulated from an exponential moving average of a time series of CQI samples.

5. The computer-implemented adaptive CQI-based HSDPA flow control method according to claim 4, further comprising the step of computing said exponential moving average formulation from the equation, $$\overline{CQI_i}(t) = \alpha \cdot CQI_i(t) + (1-\alpha) \cdot \overline{CQI_i}(t-1),$$

where $\alpha$ is a smoothing factor of the moving average formulation.

6. The computer-implemented adaptive CQI-based HSDPA flow control method according to claim 5, wherein each of said plurality of user classes is determined based on a class-indicating ratio $$\frac{\overline{CQI_i}}{K},$$

where K is a constant that represents the highest predictable CQI value in the HSDPA system, K being less than the maximum CQI supported by a specific User Equipment (UE) category.

7. The computer-implemented adaptive CQI-based HSDPA flow control method according to claim 6, further comprising the step of formulating a plurality of CQI class indicator values L from a corresponding plurality of $$\frac{\overline{CQI_i}}{K}$$

ranges, the highest L value representing the most generous credit allocation policy, the lowest L value representing the most conservative credit allocation policy, intermediate L values representing intermediate credit allocation policies.

8. The computer implemented adaptive CQI-based HSDPA flow control method according to claim 7, further comprising the steps of:
   computing a maximum output rate $R_o$ in a single time slot for a specific CQI class according to the formulation, $$R_o = \frac{TBS(L \cdot K)}{TTI},$$

where the term TBS(L·C) is a lookup function for a transport block size of a specific tabulated CQI and TTI is a transmission time interval;
   computing a maximum buffer level $B_{max}$ according to the formulation $$B_{max} = \frac{R_o \cdot Iub_{RTT}}{PDU\ Size},$$

where is one Iub round trip time required for flow control protocol to signal an RNC to refill the buffer again and PDU Size represents a size of Protocol Data Units (PDUs) arriving at the radio network controller (RNC), the number of PDU buffered in the Node B being restricted to less than a maximum level for each of the CQI classes.

9. The computer-implemented adaptive CQI-based HSDPA flow control method according to claim 8, wherein a number of credits C given according to said credit allocation policy is determined by the formulation $C = \max\{0, B_{max} - B\}$, where B is an actual buffer level at a time of said allocation.

* * * * *